(12) United States Patent
Karr et al.

(10) Patent No.: US 8,046,446 B1
(45) Date of Patent: Oct. 25, 2011

(54) SYSTEM AND METHOD FOR PROVIDING AVAILABILITY USING VOLUME SERVER SETS IN A STORAGE ENVIRONMENT EMPLOYING DISTRIBUTED BLOCK VIRTUALIZATION

(75) Inventors: Ronald S. Karr, Palo Alto, CA (US); Chio Fai Aglaia Kong, San Jose, CA (US); Gopal Sharma, San Jose, CA (US); Robert Baird, San Jose, CA (US); Santosh Rao, Santa Clara, CA (US)

(73) Assignee: Symantec Operating Corporation, Mountain View, CA (US)

( * ) Notice: Subject to any disclaimer, the term of this patent is extended or adjusted under 35 U.S.C. 154(b) by 1906 days.

(21) Appl. No.: 10/967,902

(22) Filed: Oct. 18, 2004

(51) Int. Cl.
*G06F 15/173* (2006.01)
(52) U.S. Cl. ........................................ 709/223
(58) Field of Classification Search .................. 709/223
See application file for complete search history.

(56) References Cited

U.S. PATENT DOCUMENTS

| | | | |
|---|---|---|---|
| 6,393,485 B1 * | 5/2002 | Chao et al. ..................... 709/231 |
| 6,421,711 B1 * | 7/2002 | Blumenau et al. ............ 709/213 |
| 6,725,378 B1 | 4/2004 | Schuba et al. |
| 6,801,992 B2 | 10/2004 | Gajjar et al. |
| 6,816,917 B2 | 11/2004 | Dicorpo et al. |
| 6,845,403 B2 | 1/2005 | Chadalapaka |
| 6,857,059 B2 | 2/2005 | Karpoff et al. |
| 6,877,011 B2 | 4/2005 | Jaskiewicz |
| 6,898,670 B2 | 5/2005 | Nahum |
| 7,068,164 B1 * | 6/2006 | Duncan et al. ........... 340/539.16 |
| 7,177,295 B1 * | 2/2007 | Sholander et al. ............ 370/338 |
| 7,266,637 B1 * | 9/2007 | van Rietschote ............. 711/112 |
| 7,451,347 B2 * | 11/2008 | Subbaraman et al. .......... 714/10 |
| 2002/0156987 A1 | 10/2002 | Gajjar et al. |
| 2002/0199012 A1 * | 12/2002 | Cable et al. .................... 709/233 |
| 2003/0008712 A1 * | 1/2003 | Poulin ............................. 463/42 |
| 2005/0108292 A1 * | 5/2005 | Burton et al. ................. 707/200 |

OTHER PUBLICATIONS

"Helping You Reach Your Full SAN Potential," Tivoli, 2000, (4 pages).

* cited by examiner

*Primary Examiner* — Jeffrey Pwu
*Assistant Examiner* — Shripal Khajuria
(74) *Attorney, Agent, or Firm* — Rory D. Rankin; Meyertons, Hood, Kivlin, Kowert & Goetzel, P.C.

(57) ABSTRACT

A system for ensuring availability using volume server sets in a storage environment employing distributed block virtualization includes a plurality of volume servers, one or more volume clients, one or more physical block devices and a volume server manager. The volume server manager may be configured to designate the plurality of volume servers as a volume server set with an associated volume server set management policy, and to verify each volume server in the volume server set has access to storage within each block device. In addition, the volume server manager may be configured to designate a first volume server of the volume server set to aggregate storage within the block devices into a logical volume, to make the logical volume accessible to the volume clients, and to share configuration information about the volume with the other volume servers of the volume server set.

31 Claims, 8 Drawing Sheets

SYSTEM AND METHOD FOR PROVIDING AVAILABILITY USING VOLUME SERVER SETS IN A STORAGE ENVIRONMENT EMPLOYING DISTRIBUTED BLOCK VIRTUALIZATION

BACKGROUND OF THE INVENTION

1. Field of the Invention

This invention relates to computer systems and, more particularly, to availability in storage environments employing distributed block virtualization techniques.

2. Description of the Related Art

Many business organizations and governmental entities rely upon applications that access large amounts of data, often exceeding a terabyte or more of data, for mission-critical applications. Often such data is stored on many different storage devices, which may be centrally located or distributed throughout an enterprise. Such storage devices may be heterogeneous in nature, including many different types of devices from many different manufacturers.

Configuring individual applications that consume data, or application server systems that host such applications, to recognize and directly interact with each different storage device that may possibly be encountered in a heterogeneous storage environment would be increasingly difficult as the environment scaled in size and complexity. Therefore, in some storage environments, specialized storage management software and hardware may be used to provide a more uniform storage model to storage consumers. Such software and hardware may also be configured to add storage features not present in individual storage devices to the storage model. For example, features to increase fault tolerance, such as data mirroring, snapshot/fixed image creation, or data parity, as well as features to increase data access performance, such as disk striping, may be implemented in the storage model via hardware or software.

In such a storage environment, a set of hardware or software servers (also referred to herein as volume servers) may be capable of providing the enhanced storage features to storage consumers (also referred to herein as volume clients). However, it may be impractical to allow physical access from each such server to each of the many storage devices in the storage environment. Therefore, a particular server may be configured to implement the enhanced storage functionality for a specific set of storage devices to which the server has physical access. Storage consumers may interact with the server to make use of the enhanced features during operations on data stored in the set of storage devices managed by the server. From time to time, a failure (such as a server crash or a loss of connectivity) may occur that prevents storage consumers from using the enhanced functionality. A mechanism that allows storage consumers to quickly resume access to the enhanced storage functionality in the presence of such a failure may be desirable.

SUMMARY OF THE INVENTION

Various embodiments of a system and method for providing availability using volume server sets in a storage environment employing distributed block virtualization are disclosed. According to a first embodiment, a system may include a plurality of volume servers, one or more volume clients, one or more physical block devices and a volume server manager. The volume server manager may be configured to designate the plurality of volume servers as a volume server set with an associated volume server set management policy, and to verify that each volume server in the volume server set has access to each physical block device in accordance with the policy. In addition, the volume server manager may be configured to designate a first volume server of the volume server set to aggregate storage within the physical block devices into a logical volume, to make the logical volume accessible to the volume clients, and to share configuration information about the volume with the other volume servers of the volume server set. The volume server manager may be configured as a distributed or clustered service in some implementations.

The volume server set management policy may include a variety of constituent policies or rules governing the functionality provided by the volume server set; for example, it may include a failover policy to control the manner in which volume server functionality is made highly available. A variety of different failover policies may be employed, such as a standby failover policy (in which volume server functionality is passed to a specified standby volume server in the event of a failure) and a load-based failover policy (in which a replacement volume server is selected based on workload distribution among available volume servers of the volume server set). In addition to a failover policy, a volume server set management policy may also include a connectivity policy governing the manner in which connectivity between volume servers and physical block devices is verified. A load balance policy may also be included in a volume server set management policy to control the distribution of workloads in a balanced manner among the volume servers constituting a volume server set. A constituent policy of a volume server set management policy may be invoked as a result of an automated detection of an event (such as the addition of a volume server to a volume server set), or as a result of a command issued by an administrator.

In a second embodiment, a system may include a plurality of volume servers, one or more volume clients, a plurality of physical block devices and a volume server manager. The volume servers may be designated as a volume server set with an associated volume server set management policy by the volume server manager, and the volume server manager may be configured to verify that each volume server may access each physical block device in accordance with the volume server set management policy. The volume server may also be configured to designate a first volume server to aggregate storage within the physical block devices into a first and a second logical volume, where the first logical volume uses storage within a first device group comprising a first subset of the physical block devices, and the second logical volume use storage within a second device group comprising a second subset of the physical block devices. The first and second logical volumes may be made accessible to the volume clients by the first volume server, and their configuration information may be shared with the other volume servers of the volume server set. In this embodiment, the volume server set management policy may include a first failover policy for the first device group and a second failover policy for the second device group, which may differ from the first failover policy.

Several other embodiments are also disclosed. According to a third embodiment, a system may include a plurality of volume servers, one or more volume clients, a plurality of physical block devices and a volume server manager. The volume servers may be designated as a volume server set with an associated volume server set management policy by the volume server manager, and the volume server manager may be configured to verify that each volume server may access each physical block device in accordance with the volume server set management policy. The volume server may also be configured to designate a first volume server to aggregate storage within the physical block devices into a first logical volume, and to designate a second volume server to aggregate storage within the physical block devices into a second logical volume. The first and second logical volumes may be made accessible to the volume clients by the first and second volume servers, respectively, and their configuration information may be shared with the other volume servers of the volume server set.

According to a fourth embodiment, a system may include a plurality of volume servers, one or more volume clients, a plurality of physical block devices and a volume server manager. The volume server manager may designate a first subset of the volume servers as a first volume server set with an associated first volume server set management policy, and a second subset of the volume servers as a second volume server set with an associated second volume server set management policy. The volume server manager may be configured to verify that each volume server in the first volume server set may access each physical block device in a first device group, and to verify that each volume server in the second volume server set may access each physical block device in a second device group. In addition, the volume server may also be configured to designate a first volume server of the first volume server set to aggregate storage within the first device group into a first logical volume, and to designate a second volume server of the second volume server set to aggregate storage within the second device group into a second logical volume. The first and second logical volumes may be made accessible to the volume clients by the first and second volume servers, respectively, and their configuration information may be shared with the other volume servers of their respective volume server sets. The volume server set management policies of the two volume server sets may differ.

Figure 1:
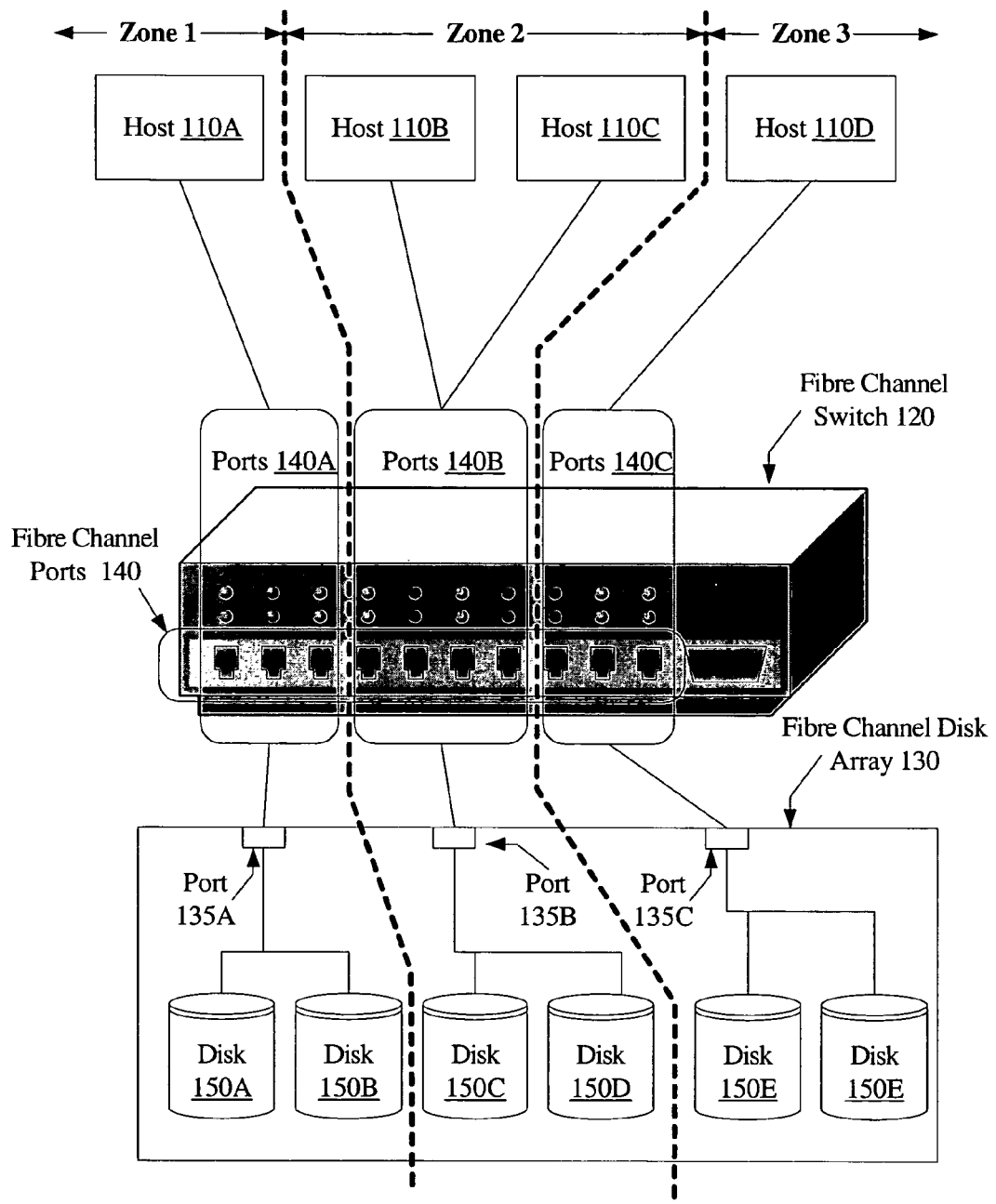
FIG. 1 is a block diagram illustrating one embodiment of a storage environment including a fibre channel switch and a fibre channel disk array.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Many large organizations may rely upon multiple applications requiring access to large amounts of data spread over hundreds or thousands of physical storage devices. A variety of different physical storage devices may be used in such storage environments, including individual disks, disk arrays, compact disc drives, digital video disk drives, tape drives, tape arrays, etc., accessible to users via a number of different storage connectivity protocols, such as various versions of Small Computer System Interface (SCSI), fibre channel, Internet SCSI (iSCSI), and the like. Direct connectivity may be available between some computer hosts and some storage devices, while connectivity may be managed using switches or other intermediary devices for other devices. In an enterprise where thousands of computer hosts may co-exist with hundreds or thousands of storage devices, it may be desired to limit the number of storage devices that may be accessible from a specific computer host. Such a limit may be desired for several reasons: for example, to improve data security, to reduce system bootup/bringup time, to reduce system administration overhead, and because the applications running on a specific computer host may typically require access to only a subset of the storage devices. Hardware restrictions (such as the maximum number of ports available for hosts to access storage within a disk array) may affect the number of hosts that may access a given storage device. Thus, it may be impracticable to allow full connectivity to all storage devices from all host computers in a large enterprise. Numerous access control techniques may be used to partition a collection of storage devices into subsets such that a given subset may be accessible only by a specified set of host computers. For example, in some storage environments, an access control technique called zoning may be employed, as described below.

FIG. 1 is a block diagram illustrating one embodiment of a storage environment including a fibre channel switch and a fibre channel disk array. Fibre channel disk array 130 may include a number of disks 150A-E. Hosts 110A-110D (which may be referred to collectively as hosts 110) may access storage within fibre channel disk array 130 via fibre channel switch ports 140 on a fibre channel switch 120. A given subset 140A of fibre channel switch ports 140 may provide connectivity to only a subset of disks 150A-B within array 130, using a disk array port 135A. The term "zoning" may be used to describe a technique of limiting access to a subset of disks 150 from a specific host 110 by allowing access from the host to only a subset (e.g., 140A) of switch ports 140. In the illustrated embodiment, three zones have been created. Zone 1 comprises host 110A, fibre channel switch ports 140A, fibre channel disk array port 135A, and disks 150A-B. Zone 2 comprises hosts 110B and 110C, fibre channel switch ports 140B, fibre channel disk array port 135B, and disks 150C-D, while Zone 3 comprises hosts 110D, fibre channel switch ports 140C, fibre channel disk array port 135C, and disks 150E-F. A specific host 110 in a given zone may not access ports or storage from another zone.

Zoning may be implemented via a variety of hardware and/or software techniques. For example, in some embodiments, a "hard" version of zoning may be implemented by physically restricting connectivity based on physical port numbers. In an implementation of hard zoning, the set of devices and hosts inside a given zone may be modified by moving fibre channel cables connected to ports 140. In contrast, "soft" zoning may restrict connectivity based on a unique identifier such as a "World-Wide-Name" (WWN) that may be associated with each port 140 and/or with each host (e.g., with a host bus adapter (HBA) incorporated at a host). In an implementation of soft zoning, a specific host 110 may only be provided a list of WWNs (by a name server, for example) corresponding to the set of ports 140A and disks 150 to which it should be granted access. In some embodiments, a specific host may be placed in multiple zones, either across multiple fibre-channel switches 120 or within a given fibre-channel switch. It may be possible to change the set of ports, hosts, or disks associated with a zone. However, at any given time, a given host 110 associated with a specific set of zones may only access the set of disks associated with that set of zones, and may not have access to disks associated with other zones. The mappings between zones, hosts, ports and disks may be maintained in a zone configuration database. The zone configuration database may be maintained at fibre channel switch 120 and made accessible via an administrative interface, or it may stored in a separate device or server (which may be incorporated within one of the hosts 110).

Other similar access control techniques, such as logical unit (LUN) masking or LUN binding may also be used for restricting access in different embodiments. The SCSI protocol allows several storage devices to be addressed as distinct LUNs associated with a single SCSI ID. A disk array may provide multiple virtual LUNs using a single SCSI ID accessible from a given SCSI bus. Instead of allowing access from any host HBA connected to the SCSI bus to any LUN, access to a particular LUN may be restricted (i.e., masked) to a combination of a specific host HBA port and a disk array port. Multiple hosts may be allowed access to a given LUN using LUN masking, and the masks may be reconfigured as necessary. The LUN masking configuration may be stored in a LUN mask database, which may be stored in a server accessible to storage administrators. LUN binding is a similar technique, where a disk array may be configured to make a particular LUN visible (and hence accessible) only from a specific subset of ports of a disk array.

Additional techniques to manage and/or restrict access to storage devices may also be employed in some embodiments. For example, in storage environments employing iSCSI (Internet SCSI), iSCSI security keys or tokens may be used to allow access to specific storage devices associated with the keys or tokens. In one embodiment, one or more servers may implement the Internet Storage Name Service (iSNS) protocol to facilitate automated discovery, management and configuration of iSCSI and/or Fibre Channel devices on a TCP/IP network. Such iSNS servers may be configured to establish and/or validate connectivity between hosts 110 and storage devices. Some operating systems or other storage management software may include provisions for automatic discovery of connected devices (for example, at boot time). In some embodiments employing Fibre Channel SANs, a given data center may include several physically separated SANs or SAN fabrics. Zoning and/or LUN masking within a given SAN may not be sufficient to manage access control across the entire data center, and techniques to bridge the physically separate SAN fabrics (such as security tokens or iSNS-based access control) may be employed, in addition to or separately from, zoning and LUN masking in such embodiments.

As described above, access control techniques such as zoning, LUN masking, LUN binding, iSCSI security keys, iSCSI access control using iSNS servers, etc., may be used to control access to specific physical storage devices within a complex storage system. In such systems, a server or a set of servers granted access to a set of physical storage devices may be configured to implement a technique called virtualization on the physical storage devices, i.e., to aggregate storage within the physical devices into virtual storage devices such as volumes that have better characteristics than the underlying physical storage devices. Enhanced capabilities provided by a volume may include, for example, increased bandwidth, decreased access latency, higher availability, flexible configuration and administration, and automated backup and restore. Access to a logical device such as a volume may also be managed by using the access control techniques described above on the physical storage underlying the volume.

Figure 2:
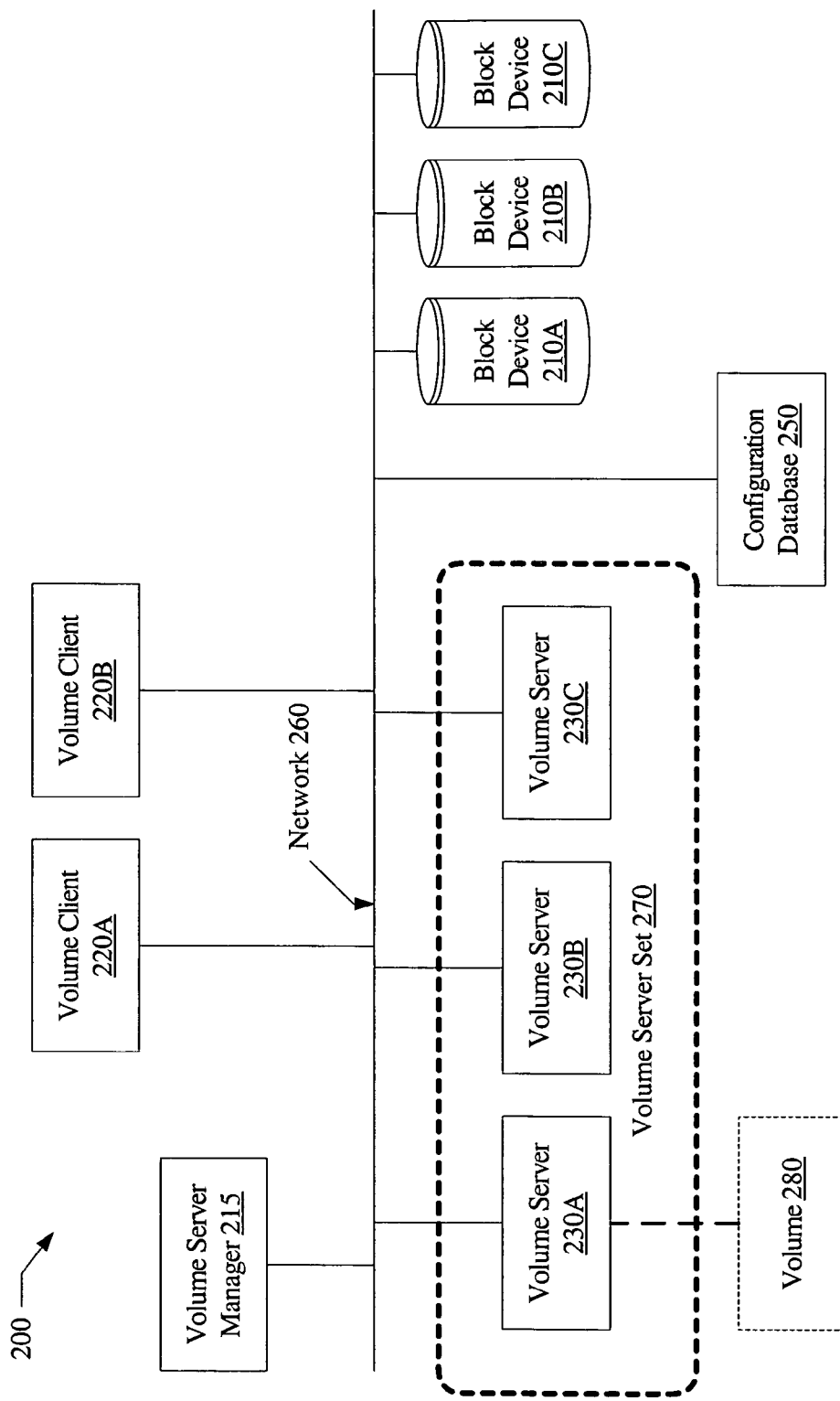
FIG. 2 is a block diagram illustrating one embodiment of a storage system.

FIG. 2 illustrates a storage system 200 according to one embodiment. In the illustrated embodiment, system 200 includes block devices 210A-C, volume servers 230A-C, volume clients 220A-B and a volume server manager 215 coupled to a network 260. Volume server manager 215 may be configured to designate volume servers 230A-C as a volume server set 270 with an associated volume server set management policy, as described in further detail below. Each volume server 230 may be provided access to each block device 210 using an access control technique similar to those described earlier. Volume server 230A may be designated by volume server manager 215 to aggregate storage in block devices 210 into a volume 280 and present volume 280 to volume clients 220. Volume server 230A may also be configured to share configuration information on volume 280 with other volume servers (i.e., 230B and 230C) within volume server set 270. A configuration database 250 may be used to store configuration information on volumes, such as volume 280, managed by volume server set 270, and may be accessible from each volume server 230.

Generally speaking, a block device 210 may comprise any hardware or software entity that provides a collection of linearly addressed data blocks that can be read or written. For example, in one embodiment a physical block device 210 may be a single disk drive configured to present all of its sectors as an indexed array of blocks. It is contemplated that any suitable type of storage device may be configured as a block device, such as fixed or removable magnetic media drives (e.g., hard drives, floppy or Zip-based drives), writable or read-only optical media drives (e.g., CD or DVD), tape drives, solid-state mass storage devices, or any other type of storage device. In some embodiments, a block device 210 may also be a logical or virtual storage device resulting from a mapping of blocks of one or more physical storage devices, as described in greater detail below.

Hardware devices configured to provide a collection of linearly addressed data blocks may generally be referred to as physical block devices, and logical or virtual storage devices so configured may generally be referred to as logical or virtual block devices. It is contemplated that in some embodiments, data blocks may be uniformly sized across different physical and logical block devices, while in other embodiments physical and logical block devices may employ different block sizes. It is also contemplated that in some embodiments, block sizes may vary among particular physical block devices and/or particular logical block devices, or even within a given block device.

A block device may differ from a file in that it may not require use of a file system for access; that is, a consumer of a block device 210 may read or write blocks directly to the device, bypassing any file system that may be in use. In some embodiments, a block device 210 presented by an operating system for use by a consumer may present relatively few primitives through which the device may be manipulated. For example, in one embodiment a block device 210 may support open, close, read and write primitives, plus a few miscellaneous control and query primitives. In contrast, file systems may provide a richer set of primitives, such as support for creating and removing files, appending to files, creating and removing directories, etc. Typical interfaces to block devices may allow for higher raw throughput and greater concurrency than typical interfaces to single files of a file system. Block devices 210 that are physical storage devices, such as disks or tape drives, may be configured to present some form of SCSI interface, though other interfaces are possible and contemplated.

Generally speaking, a volume 280 (which may also be referred to herein as a logical volume) may comprise a block device that may be presented directly for use by a block device consumer, e.g., a volume client 220. In one embodiment, a volume client 220 may be a file system or an application (such as a database application, for example) that can directly use block devices. As described in greater detail below, in some embodiments employing block device virtualization, a given volume 280 may be associated with several logical or physical block devices. In such embodiments, each block device included in the logical organization of a given volume or virtualized block device may be referred to as a storage object or logical storage object.

A volume may differ from a block device interface implemented in a hardware device or that is accessed through a system disk driver, in that the latter block devices may not present a system-independent block device interface that can be opened for direct use by a consumer. Instead, a system-dependent disk driver may be required to access such block devices. In embodiments employing block virtualization, such a disk driver may be generally unaware of block virtualization and may in some instances present a barrier to using some virtualization techniques, whereas a volume implementing various block virtualization features may be directly accessible by a consumer without the issues presented by such disk drivers.

A volume manager, such as volume server 230A, may introduce virtualization of blocks, creating some number of virtualized block devices out of one or more physical or logical block devices. (In some embodiments, devices such as disk arrays and virtualization switches may also be configured to perform block virtualization.) In one embodiment of block virtualization, one or more layers of software and/or hardware rearrange blocks from one or more block devices, such as disks, and add various kinds of functions. The resulting rearranged collection of blocks may then be presented to a block device consumer, such as an application or a file system, as one or more aggregated devices with the appearance of one or more basic disk drives. That is, the more complex structure resulting from rearranging blocks and adding functionality may be presented as if it were one or more simple arrays of blocks, or logical block devices. It is noted that a virtualized block device may also be referred to as a logical block device, and that in some embodiments, multiple layers of virtualization may be implemented. That is, one or more block devices may be mapped into a particular virtualized block device, which may be in turn mapped into still another virtualized block device, allowing complex storage functions to be implemented with simple block devices.

In various embodiments, block virtualization can support the creation of virtualized block devices implementing numerous different types of storage functions. For example, in one embodiment a virtualized block device may implement device striping, where data blocks may be distributed among multiple physical or logical block devices, and/or device spanning, in which multiple physical or logical block devices may be joined to appear as a single large logical block device. In some embodiments, virtualized block devices may provide mirroring and other forms of redundant data storage, the ability to create a snapshot or static image of a particular block device at a point in time, and/or the ability to replicate data blocks among storage systems connected through a network such as a local area network (LAN) or a wide area network (WAN), for example. Additionally, in some embodiments virtualized block devices may implement certain performance optimizations, such as load distribution, for example, and/or various capabilities for online reorganization of virtual device structure, such as online data migration between devices. Block virtualization may provide any or all of these capabilities in a fashion transparent to virtualized block device consumers. That is, virtualized block devices may appear as generic storage devices to consumers such as file systems and applications.

Volume server 230A may provide functions such as configuration management of virtualized block devices and distributed coordination of block device virtualization. For example, in one embodiment volume server 230A may be aware of the type and quantity of physical storage devices, such as block devices 210, that are available within a storage system. In various embodiments, the virtualization functions provided by volume server 230A may be provided at different levels in the storage hierarchy between a volume client 220 and block devices 210.

For example, in one embodiment, volume clients 220 may be provided with a description of a virtualized block device and may be configured to directly access constituent block devices comprising the virtualized device. Such virtualization may also be referred to as host-based or client-based virtualization. In response to a request to configure a virtual block device, for example according to a desired set of virtualization features, volume server 230A may be configured to build a volume description that describes how a collection of storage objects compliant with the desired features maps to underlying physical block devices. The volume description identifying a particular volume 280 may be distributed to one or more volume clients 220. In one embodiment, such a volume description may be a tree of storage objects such as described in greater detail below in conjunction with the description of FIG. 3. Each volume client 220 may be configured to interact with volume server 230A for certain functions, for example management or administrative functions. For typical block read and write activity, each volume client 220 may be configured to interact directly with various block devices 210 according to the volume description distributed by volume server 230A.

The structure of the volume 280, for example as indicated by its corresponding storage object tree, may indicate to a given volume client 220 how the volume relates to one or more underlying physical storage devices. In one embodiment, the leaf nodes of such a tree may correspond to one or more physical block devices such as block devices 210, and the root node of such a tree may be a logical block device through which the volume is accessed by a consumer. Distribution of a virtualized block device as a volume to one or more volume clients 220 may also be referred to as distributed block virtualization. In some embodiments, after volume server 230A has distributed a volume description of a given virtual block device to a given volume client 220 as a particular volume 280, the given volume client 220 may interact with that particular volume 280 to read and write blocks without further involvement on the part of volume server 230A, as described above. That is, the given volume client 220 may use the structure of the particular volume 280 to transform I/O requests generated by various consumers of that volume 280 into I/O requests directed to specific physical storage devices, such as block devices 210.

In some embodiments, details of block virtualization may not be directly available to individual volume clients 220. In some such embodiments, the virtualization function of volume server 230A may be implemented in a device or layer of abstraction in between volume clients 220 and block devices 210, such as a switch or virtualization appliance. Such virtualization may also be referred to as switch-based or appliance-based virtualization.

Additionally, in some embodiments, multiple layers of virtualization may be employed, for example at the host level as well as at the switch or appliance level. In such embodiments, some aspects of virtualization may be visible to volume clients 220, as in the host-based model, while some aspects may be implemented transparently by an intermediate device, as in the switch-based model. Further, in some multilayer embodiments, the virtualization details of one block device (e.g., one volume 280) may be fully defined to a volume client 220 (i.e., without further virtualization at the switch layer), while the virtualization details of another block device (e.g., another volume) may be partially or entirely transparent to volume client 220.

Figure 3:
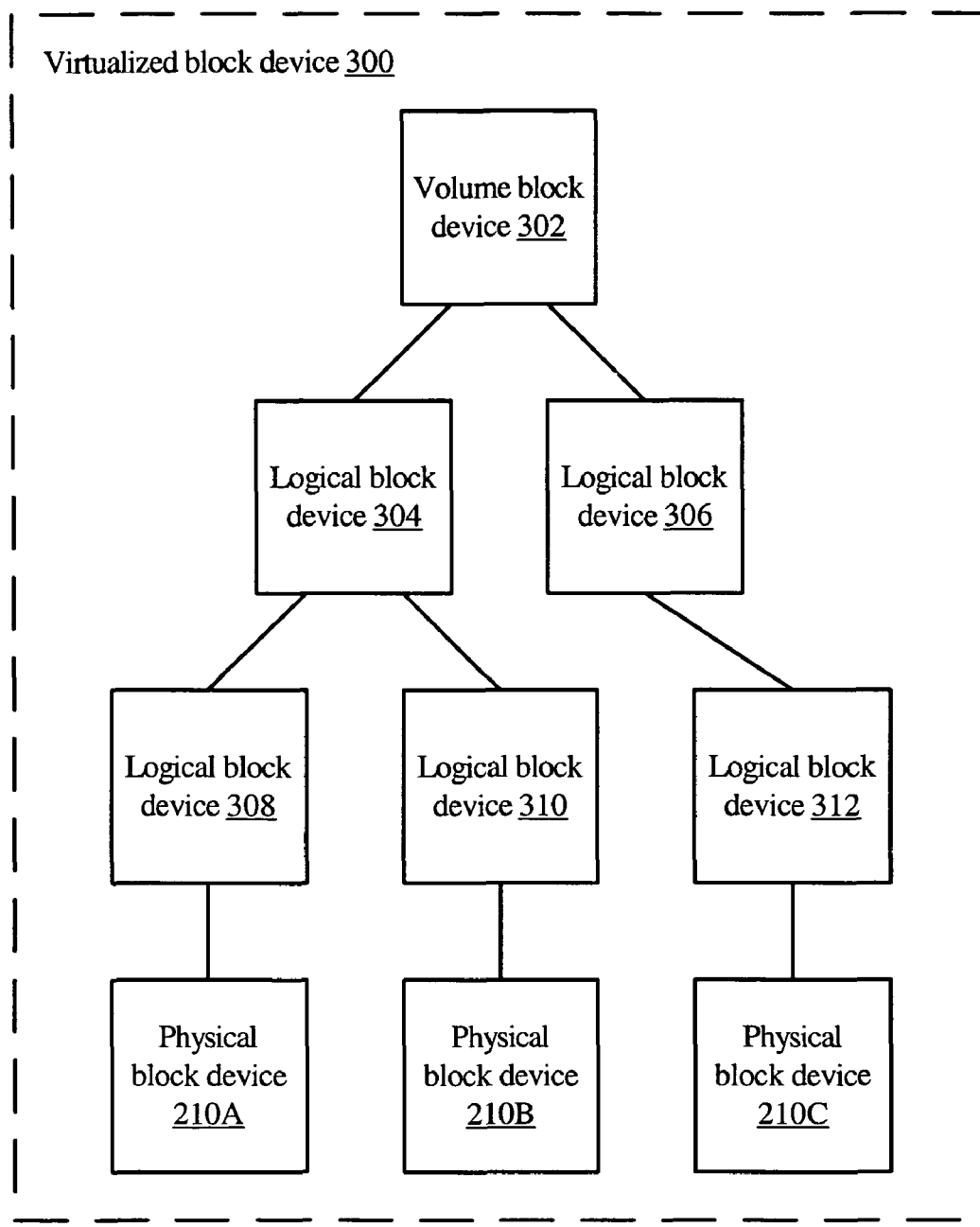
FIG. 3 is a block diagram illustrating one embodiment of a virtualized block device that may be presented as a volume.

One embodiment of a virtualized block device that may be presented to a volume client 220 as a volume 280 is illustrated in FIG. 3. In the illustrated embodiment, virtualized block device 300 includes a volume block device 302 that includes logical block devices 304 and 306. In turn, logical block device 304 includes logical block devices 308 and 310, while logical block device 306 includes logical block device 312. Logical block devices 308, 310, and 312 map to physical block devices 210A-C of FIG. 2, respectively.

Virtualized block device 300 may in its entirety represent the structure of the data comprising a given volume 280, which data may be physically stored in physical block devices 210A-C. Volume block device 302 may be configured to be mounted within a file system or presented to an application or other volume consumer as the interface through which the consumer may interact with given volume 280. Each block device that maps to or includes another block device may include an interface whereby the mapping or including block device may interact with the mapped or included device. For example, this interface may be a software interface whereby data and commands for block read and write operations is propagated from lower levels of the virtualization hierarchy to higher levels and vice versa.

Additionally, a given block device may be configured to map the logical block spaces of subordinate block devices into its logical block space in various ways in order to realize a particular virtualization function. For example, in one embodiment, virtualized block device 300 may be configured as a mirrored volume, in which a given data block written to virtualized storage device 300 is duplicated, and each of the multiple copies of the duplicated given data block are stored in respective block devices. In one such embodiment, volume block device 302 may be configured to receive an operation to write a data block from a consumer of corresponding volume 280. Volume block device 302 may duplicate the write operation and issue the write operation to both logical block devices 304 and 306, such that the block is written to both devices. In this context, logical block devices 304 and 306 may be referred to as mirror devices. In various embodiments, volume block device 302 may read a given data block stored in duplicate in logical block devices 304 and 306 by issuing a read operation to one mirror device or the other, for example by alternating devices or defaulting to a particular device. Alternatively, volume block device 302 may issue a read operation to multiple mirror devices and accept results from the fastest responder.

As described above and shown in FIG. 3, in some embodiments a virtualized block device 300 may employ multiple layers of virtualization. For example, in the embodiment described above where logical block devices 304 and 306 function as mirror devices, it may be the case that underlying physical block devices 210A-C have dissimilar performance characteristics; specifically, devices 210A-B may be slower than device 210C.

In order to balance the performance of the mirror devices, in one embodiment, logical block device 304 may be implemented as a striped device in which data is distributed between logical block devices 308 and 310. For example, even- and odd-numbered blocks (or groups of blocks) of logical block device 304 may be mapped to logical block devices 308 and 310 respectively, each of which may be configured to map in turn to all or some portion of physical block devices 210A-B respectively. In such an embodiment, block read/write throughput may be increased over a non-striped configuration, as logical block device 304 may be able to read or write two blocks concurrently instead of one. Numerous striping arrangements involving various distributions of blocks to logical block devices are possible and contemplated; such arrangements may be chosen to optimize for various data usage patterns such as predominantly sequential or random usage patterns.

In another aspect illustrating multiple layers of block virtualization, in one embodiment physical block device 210C may employ a different block size than logical block device 306. In such an embodiment, logical block device 312 may be configured to translate between the two physical block sizes and to map the logical block space defined by logical block device 306 to the physical block space defined by physical block device 210C. In some instances, the logical block space of logical block device 312 need not be contiguously mapped to blocks of physical block device 210C; an arbitrary mapping may be used.

Numerous other possible configurations of block devices are contemplated that may incorporate more or fewer layers of virtualization to realize within a given instance of virtualized block device 300 virtualization functions similar to or different from those described above. For example, volume block device 302 may employ a greater number of mirror devices, striping may occur higher in the hierarchy than mirroring, certain logical block devices may be configured to perform snapshots of other devices, certain logical block devices may span multiple physical block devices, etc.

In one embodiment, volume server 230A may be configured to read and update configuration information corresponding to volume descriptions (such as a storage object tree corresponding to a given volume) from configuration database 250. The configuration information in the database may establish the logical configuration of data on the physical storage devices 210 (e.g., block devices 210A-C). For example, such configuration information may indicate how various logical and physical block devices are divided, striped, mirrored, etc. In one embodiment, the configuration information may be stored on the devices (e.g., block devices 210A-C) that are being virtualized. It is contemplated that in some embodiments, configuration of a given virtualized block device may be managed and/or stored in data structures other than trees of objects. For example, in one embodiment, tables may be used to map virtual block devices to physical storage. As stated earlier, configuration database 250 may be accessible from all volume servers 230 within volume server set 270, allowing configuration information on volume 280 to be shared by all volume servers within the volume server set.

As noted above, the configuration associated with a virtual block device may change over time, such as to add or remove mirrors; migrate data to new storage; increase or decrease the size of the device; create, manipulate, or remove snapshots; add structure for a new capability; etc. In some embodiments, if the volume description of a given volume 280 is distributed to more than one volume client 220, any changes that affect the structure of the given volume 280 may need to be coherently coordinated among the relevant volume clients 220. In one embodiment volume server 230A may be configured to coordinate such changes. For example, volume server 230A may be configured to coordinate quiescence of those volume clients 220 to which the given volume 280 is distributed, in order to temporarily suspend activity to given volume 280. Volume server 230A may further distribute changes to the structure of given volume 280 to relevant volume clients 220 in an effectively atomic fashion, such that either all or none of the relevant clients 220 receive the changes.

In some embodiments, volume server 230A may be configured to distribute all defined volumes 280 to each volume client 220 present within a system. Such embodiments may be referred to as symmetric distributed block virtualization systems. In other embodiments, specific volumes may be distributed only to respective volume clients 220, such that at least one volume 280 is not common to two volume clients 220. Such embodiments may be referred to as asymmetric distributed block virtualization systems.

As stated earlier, volume clients 220 may interact with volume server 230A as needed, for example to obtain updated information on the structure or layout of volume 280. From time to time, a failure may occur within system 200 that may prevent a volume client 220 from obtaining the desired information. For example, volume server 230A may become unavailable due to a hardware failure or a system crash, or may become inaccessible due to a loss of connectivity. In such a situation, it may be desired that a second volume server, which may be designated as a failover volume server, be selected to provide virtualization functionality in place of volume server 230A. It may further be desired that the failover volume server take over from volume server 230A fairly quickly after a failure, in order to prevent a sustained disruption of applications running on volume clients 220 that may need access to volume 280. In order to be able to support the functionality previously being provided by volume server 230A, however, the failover volume server may need to have access to block devices 210, just as volume server 230A had access to block devices 210 prior to the failure. If a potential failover volume server does not already have access to block devices 210 at the time that the failure of volume server 230A is detected (for example, if a potential failover volume server is in a different zone than devices 210), it may take a substantial amount of time to provide the potential failover volume server with the needed access. Certain configuration restrictions (e.g., a limit on the maximum number of devices supported by an operating system at a given host, or a requirement to reboot in order to discover new storage devices) may also make a transfer or failover of volume server functionality a difficult or lengthy process.

In order to ensure that the functionality of volume server 230A may be taken over quickly in the event of a failure, in one embodiment volume server manager 215 may be configured to designate one or more additional volume servers (such as 230B and 230C) as potential failover volume servers for volume server 230A and verify that the additional volume servers have access to the block devices 210 underlying volume 280. In such an embodiment, as illustrated in FIG. 2, volume servers 230A-C may be designated collectively by volume server manager 215 as a volume server set 270. It is noted that in some embodiments, a volume server set may consist of just two volume servers, an active volume server and a single failover volume server. A volume server set including of multiple potential failover volume servers, such as volume server set 270 in FIG. 2, may support a higher level of availability than a volume server set including a single potential failover volume server, by allowing a quick restoration of volume server functionality even in the presence of multiple failures that may occur close together in time (e.g., a first failure at volume server 230A followed shortly by a second failure at volume server 230B).

Thus, a volume server set 270 may include a plurality of volume servers 230, each of which is configured to have access to each of a specific set of block devices 210 that collectively contain storage used for a logical volume 280 presented to one or more clients 220. In one embodiment, a specific volume server 230A from volume server set 270 may be designated as the active or primary volume server for volume 280 by volume server manager 215. The term "active volume server" for a volume 280 managed at a volume server set 270, as used herein, means a volume server that is responsible for aggregating storage within block devices 210 into volume 280, providing access to volume 280 to volume clients 220, and making configuration information for volume 280 accessible to other volume servers within volume server set 270. At any given point in time, only one volume server may provide such virtualization functionality for a given volume, i.e., there may be only one active volume server for a given volume. In the event of a failure of an active volume server 230A, volume server manager 215 may designate a second volume server 230B to assume the role of active volume server for a given volume 280, as described in greater detail below. Subsequent to the failure, the failed volume server 230A may be repaired (i.e., the cause of the failure may be determined and fixed), allowing the original active volume server 230A to rejoin the volume server set. In some embodiments, the repaired volume server 230A may be designated as a potential failover volume server for the current active volume server 230B. In one embodiment, volume server functionality may be failed back to volume server 230A when it becomes possible to do so: i.e., a transfer of volume server functionality to volume server 230B may be temporary, and may only last until failed volume server 230A recovers.

As stated above, multiple potential failover volume servers may be present within a given volume set 270 in some embodiments. In one embodiment, in order to identify the specific volume server that may take over from a failed volume server, and to support additional volume server set functionality as described below, volume server manager 215 may associate a volume server set management policy with a volume server set 270.

A volume server set management policy may include a set of constituent policies or rules for managing a volume server set under normal operating conditions as well as in the presence of a failure. In one embodiment, a volume server set management policy may include a failover policy, which may be employed to select a failover volume server from among multiple potential failover volume servers. In another embodiment, a connectivity policy may be included within a volume server set management policy, to manage connectivity verification between individual volume servers 230 and block devices 210. In a third embodiment, a volume server set management policy may include a load balance policy to help overall system performance by distributing volume server functionality among a set of volume servers 230 within a volume server set 270. In different embodiments, a volume server set management policy may include any combination of these and other constituent policies: for example, a volume server set management policy may include a failover policy, a connectivity policy, as well as a load balance policy in one embodiment. Further details regarding constituent policies that may be included within a volume server set management policy are provided below. Configuration information on a volume server set, including details of the constituents of a volume server set management policy for the volume server set, may be maintained in a volume server set configuration database by volume server manager 215 in some embodiments. In one embodiment, where volume server manager 215 is hosted at a particular server computer system, the volume server set configuration database may be hosted at a separate server.

A failover policy may be used to select a specific volume server as the next active volume server in the event of a failure. As described in further detail below, volume manager server 215 may monitor the status of an active volume server 230A periodically, and may thereby be able to detect the occurrence of a failure at volume server 230A. In one embodiment, volume server manager 215 may explicitly designate a specific standby volume server 230B to take over from an active volume server 230A if a failure is detected. Such a failover policy, where a specific volume server is pre-selected to take over virtualization functionality from a given active volume server, may be termed a standby failover policy. In another embodiment, the selection of the new active volume server may be based on load conditions at the time of the failure, rather than on an explicit designation of a standby volume server. Such a failover policy may be termed a load-based failover policy. For example, as illustrated in FIG. 2, volume server set 270 may have two volume servers 230B and 230C capable of taking over the functionality of volume server 230A. If a load-based failover policy were being employed at volume server set 270, volume server manager 215 may be responsible for gathering workload statistics on volume servers 230. For example, CPU usage statistics, network usage statistics, or other load-related information such as the number of recovery operations in progress or the number of volume configuration changes in progress may be gathered periodically by volume server manager 215 for each volume server 230. When a failure occurs, volume server 215 may select the least loaded volume server, based on the workload statistics gathered, as the next active volume server. In one implementation of a load-based failover policy, a mathematical operation on the raw collected workload statistics may be periodically performed by volume server manager 215 to help identify an appropriate volume server as an active volume server. For example, if CPU utilization is used as a metric of volume server load, the average CPU utilization at each volume server over the previous hour may be calculated every five minutes and used to choose the least-loaded volume server (other than a failed volume server) as the active volume server.

In addition to standby and load-based failover policies, various other failover policies may also be employed in different embodiments. For example, in some embodiments, an agent or device other than volume server manager 215 may be used to manage failover for volume server set 270: for example, an application-specific algorithm using information not available at the level of volume server manager 215 may be used to select the next active volume server. Such a failover policy may be termed an external failover policy. In such embodiments, an external agent (such as an application) or device may be responsible for selecting the next active volume server and informing volume server manager 215 of the selection. In one specific embodiment, it may be desired that for a specific volume server set, no automatic transfer of volume server functionality be performed. In such a case, a policy termed "no-failover" may be included in the volume server set management policy. A no-failover policy may be employed, for example, in an environment where it may be acceptable for an application to wait until a failed volume server recovers from a failure before volume server functionality again becomes available. It is noted that in some embodiments, a subset or all of the volume servers 230 comprising a volume server set 270 may be configured as a cluster, and technology such as Cluster Volume Manager™ (CVM) from VERITAS Software may be employed to fail over part or all of volume server functionality from one node of the cluster to another in the event of a failure. That is, a volume server manager 215 may be configured to utilize existing clustering technology (including cluster failover mechanisms) in such embodiments.

Figure 4:
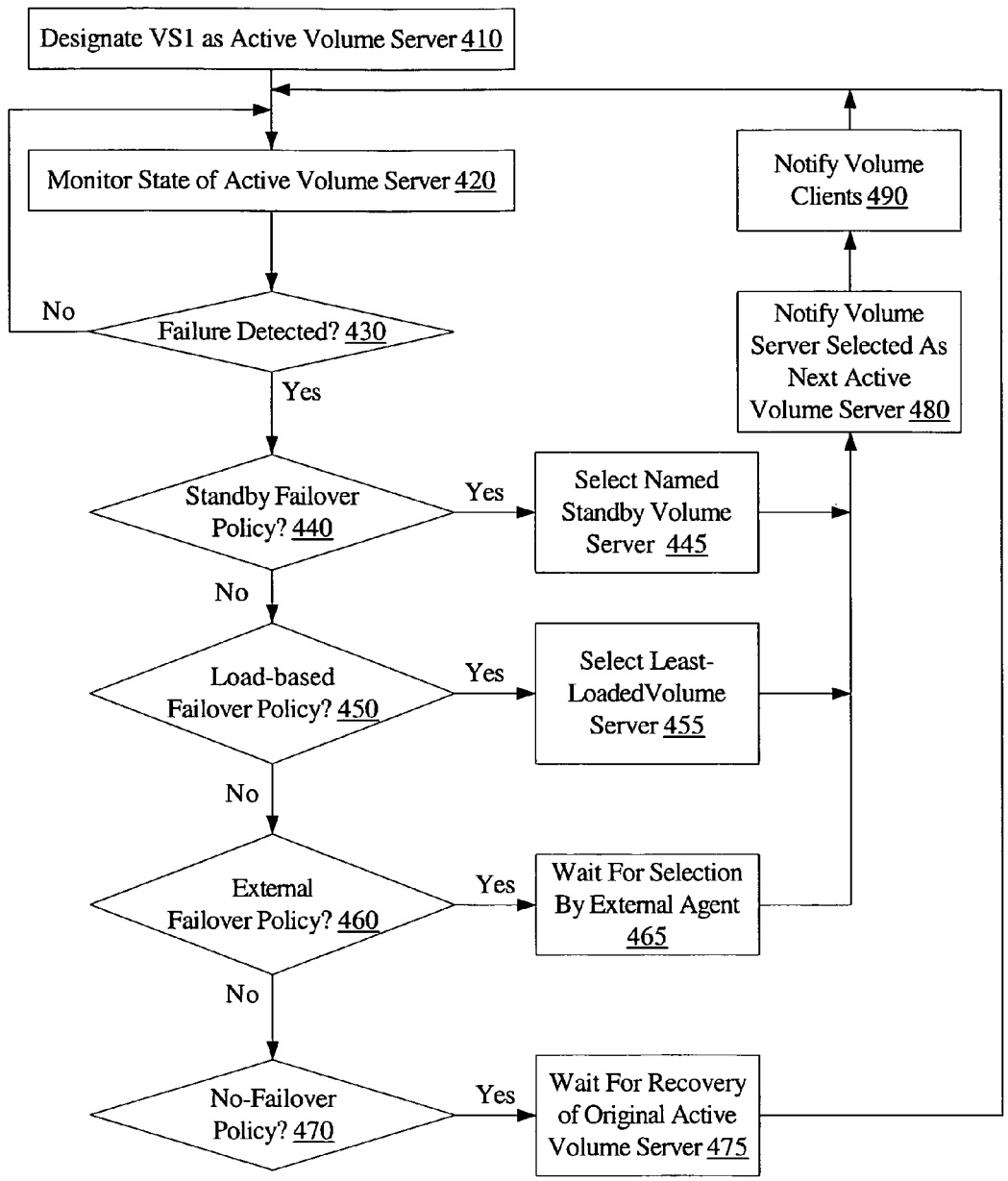
FIG. 4 is a flow diagram illustrating aspects of the operation of one embodiment of a volume server manager configured to use a failover policy.

FIG. 4 is a flow diagram illustrating aspects of the operation of one embodiment of a volume server manager 215 configured to use a failover policy as described above for a volume server set 270. As depicted, volume server manager 215 may initially designate one volume server ("VS1") as the active volume server for the volume (block 410). Volume server manager may monitor the status of VS1 periodically (block 420), and if a failure is detected (decision block 430), a second volume server (or VS1 itself, in the case of a No-Failover policy) may be designated as the next active volume server for volume 280 using the specific failover policy included in the volume server set management policy for volume server set 270 (blocks 440-475). Once the next active volume server (e.g., 230B) is identified, volume server manager 215 may notify the selected volume server to begin acting as the active volume server for volume 280 (block 480). Volume clients may then be notified (block 490) of the selection of the new active volume server, e.g., by the new active volume server or by volume server manager 215. As illustrated, subsequent to the transfer of volume server functionality, volume server manager 215 may periodically monitor the state of the newly designated active volume server, just as it had previously monitored the state of original active volume server 230A.

In one embodiment, volume server manager 215 may also be configured to use a combination of failover policies, for example in a specified order of preference, to respond to a single failure. E.g., an external failover policy may be a first preference, but if the external agent responsible for selecting the next active volume server does not respond to a failure within a specified period, a standby volume server may be selected instead.

Figure 5:
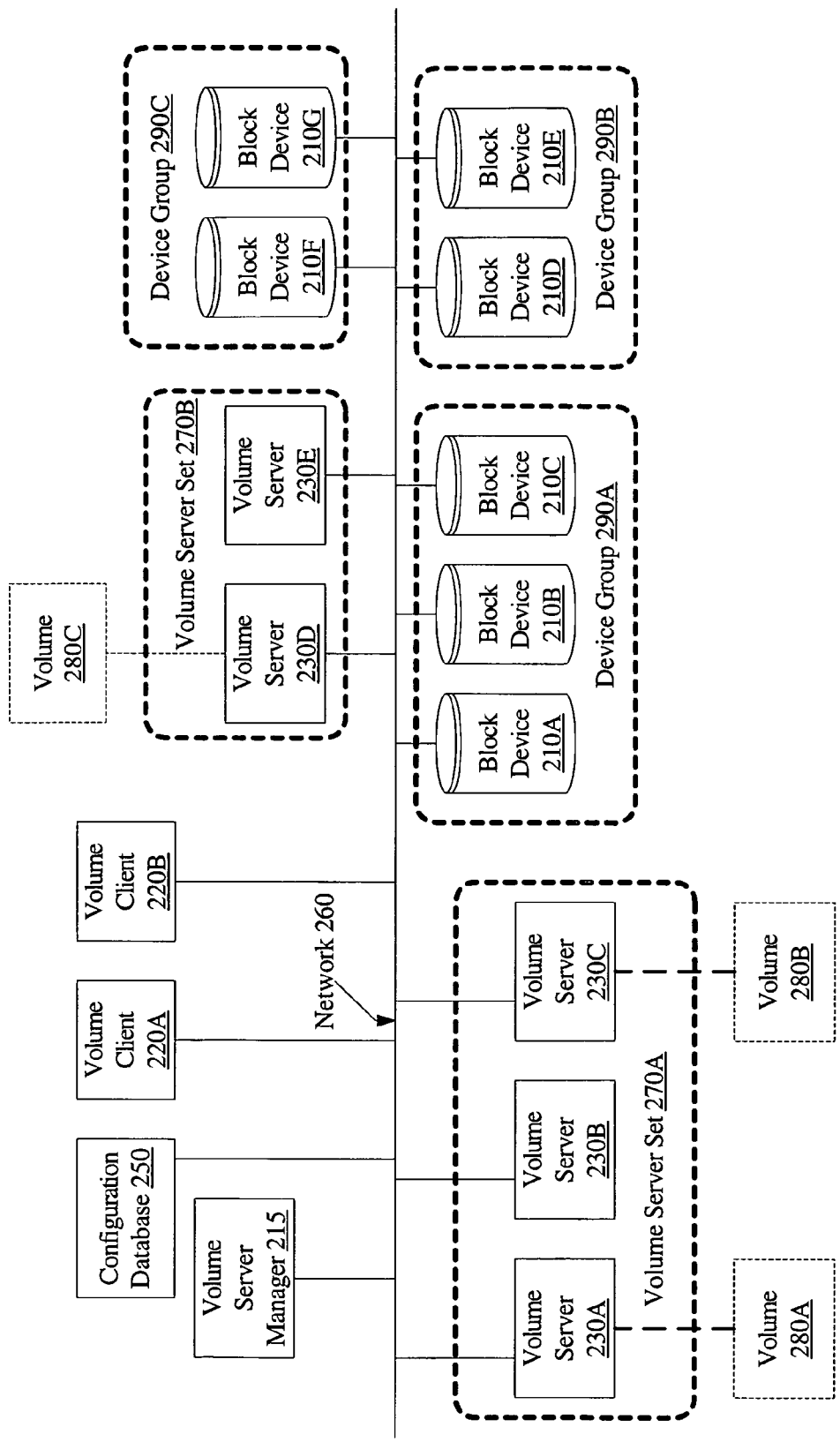
FIG. 5 is a block diagram illustrating one embodiment of a system including two volume server sets.

A volume server manager may use a volume server set to provide volume server functionality for multiple volumes in some embodiments, and a corresponding volume server set management policy may therefore include multiple failover policies. FIG. 5 illustrates an embodiment of a system in which a first volume server set 270A provides volume server functionality for two volumes 280A and 280B, and a second volume server set 270B provides volume server functionality for a third volume 280C. Volume server manager 215 manages volume server sets 270A and 270B. Volume server 230A is configured to aggregate storage in block devices 210A-C into volume 280A, make volume 280A accessible to volume clients 220, and make configuration information on volume 280A accessible to all the volume servers in volume set 270A.

Similarly, volume server 230C is configured to aggregate storage in block devices 210D-E into a second volume 280B, make volume 280B accessible to volume clients 220, and make configuration information on volume 280B accessible to all the volume servers in volume set 270A. Thus, volume server 230A may be configured as the active volume server for volume 280A and the underlying set of block devices, i.e., block devices 210A-C, while volume server 230C may be configured as the active volume server for volume 280B and block devices 210A-D 290B. Volume server set manager 215 may verify that each volume server 230A-C within volume server set 270A has access to each block device 210A-E. As such, each volume server within volume server set 270A may be capable of providing volume server functionality for any of the volumes (280A and 280B) managed by the volume server set.

A failover policy may be associated with each volume managed within a volume server set in one embodiment. For example, a first failover policy (such as a standby failover policy) may be used for volume 280A and a second failover policy (such as a load-based failover policy) may be used for volume 280B.

In another embodiment, a failover policy may be associated with a group of block devices and the volumes aggregated from the group of block devices, rather than with a single volume. Such a failover policy may be employed, for example, in an environment where the block devices 210 of a storage system may be organized for administrative purposes into named subsets or device groups (which may also be referred to as disk groups where the physical block devices are disks). FIG. 5 illustrates three device groups: device group 290A comprising block devices 290A-C, device group 290B comprising block devices 210D-E, and device group 290C comprising block devices 210E-G. In some embodiments, a given volume 280 may utilize storage from the devices of one device group 290, but may not span multiple device groups. In the embodiment illustrated in FIG. 5, if a device group based failover policy were used for volume server set 270A, a first failover policy may be associated with device group 290A and a second failover policy, which may differ from the first, may be associated with device group 290B. As multiple volumes may be created using storage within a given group of block devices, such as 290A, multiple volumes may share a given failover policy in some embodiments. For example, another volume, such as volume 280D (not shown in FIG. 5) may be aggregated using storage within block devices 210A-C, and volume server 230A may be configured as the active volume server for such a volume 280D. If a device group based failover policy were employed for the volume server set (e.g., if volume server 230B were designated as a standby volume server for the device group 290A), then a failure of active volume server 230A would result in a failover of volume server functionality for both volume 280A and 280D to the same volume server (e.g., 230B).

As described above, a failover policy may be load-based in some embodiments, i.e., a least-loaded volume server may be selected as the next active volume server from among the set of candidate volume servers, based on some specified load metric. In one embodiment where a device group based failover policy may is employed, the number of block devices currently being managed by a candidate volume server 230 (i.e., the number of block devices for which the candidate is an active volume server) may also be used as a load metric.

As also described earlier, a volume server 230A may recover from a failure (e.g., by rebooting after a server crash) and be capable of resuming volume server functionality it had provided earlier for a device group or for a set of volumes. In one embodiment, a failover policy may also include a failback requirement that volume server functionality should be passed back to volume server 230A upon recovery. In some implementations of such an embodiment, the failback requirement may also include some additional criteria that should be met prior to failing back volume server functionality to a volume server 230A: e.g., that the failback volume server 230A must remain free from failures for a specified interval (e.g., an hour) prior to the fail back In order for a failover volume server 230B to quickly take over volume server functionality for a given volume 280 upon a failure at an active volume server 230A, configuration information about volume 280 needs to be accessible to volume server 230B. In one embodiment, the needed configuration information may be stored in a configuration database 250 accessible by each volume server, and updated as needed by the active volume server. In other embodiments, active volume server 230A may directly provide such configuration information to each other volume server in volume server set 270. For example, when the configuration of a volume 280 is changed, the active volume server may broadcast the changed configuration to all other volume servers within the volume server set in some embodiments.

As described previously, volume clients 220 may interact with the active volume server of a volume server set as needed, to obtain information needed to access storage within a volume 280, such as a current version of the structure or layout of volume 280. Once the required information is obtained at a volume client 220, the volume client may perform I/O operations directly on block storage devices 210. If the layout of a volume 280 is modified, or any other changes made to volume configuration that may affect the ability of a volume client 220 to access storage within volume 280, the changes may need to be communicated to volume client 220 by a volume server. An active volume server 230 may therefore include an identification of the set of current volume clients 220 accessing volume 280 in the configuration information maintained on volume 280 in some embodiments. As this configuration information is accessible to all the volume servers 230 within volume server set 270, a volume server that takes over volume server functionality for volume 280 after a failure may use this information to notify the volume clients 220 that a failover has occurred, and to identify itself as the new active volume server for volume 280. In some embodiments, the volume server manager 215 may send a notification identifying the new active volume server to the volume clients 220.

Various kinds of failures may lead to the failover of volume server functionality in accordance with the failover policy being used for a given volume server set. For example, hardware such as a processor or disk local to an active volume server 230A may fail, or a network failure may cause a loss of connectivity between active volume server 230A and other elements of system 200, such as volume server manager 215, other volume servers 230, block devices 210, or volume clients 220. As stated earlier, volume server manager 215 may periodically monitor the state of active volume server 230A, for example by sending a "heartbeat" message to volume server 230A once every 30 seconds and receiving an acknowledgment for each such heartbeat message. If an acknowledgment is missed, or a sequence of several acknowledgments is not received at volume server 215, volume server manager 215 may determine that a failure has occurred at active volume server 230A. As illustrated in FIG. 4, volume server manager 215 may then notify a volume server 230B (chosen in accordance with the failover policy in use) that it has been selected to take over volume server functionality from volume server 230A. Under some circumstances (e.g., when original active volume server 230A recovers quickly from the failure, or when a network failure that isolated volume server 230A temporarily led to the failover), volume server 230A may attempt to continue to provide volume server functionality for volume 280 even after volume server manager 215 may have initiated a new active volume server. In order to prevent volume server 230A from writing to block devices 210, and thereby potentially corrupting metadata for volume 280 now being managed by volume server 230B, a technique such as I/O fencing may be employed by volume server 230B in some embodiments. I/O fencing is an operation performed on a block device to prevent writes by other hosts or initiators to the block device. For example, a block device conforming to the SCSI-3 protocol may provide a feature called "persistent group reservations" that allows only specific hosts (e.g., hosts that hold persistent group reservations) to write to the block device. Such reservations may be used by volume server 230B to prevent volume server 230A from writing to block devices 210 after a failover of volume server functionality to volume server 230B has begun. Upon being prevented from accessing block devices 210, volume server 230A may in some embodiments communicate with volume server manager 215 to identify the current active volume server (230B) for volume 280, and may stop attempting to provide volume server functionality after such an identification. In addition, in order to prevent data corruption, in some embodiments, I/O fencing or other similar techniques may also be used to prevent access to volume 280 from volume clients that have not been granted access by the new active volume server (230B), or that have not communicated with the new active volume server since the failover. The new active volume server may, upon communication or request from a volume client, provide access to the volume using any of the techniques described above, such as zoning, LUN masking, SCSI-3 persistent group reservations, security keys, etc.

As described above, volume server manager 215 may be configured to monitor the status of active volume server 230A periodically. In some embodiments, volume server manager 215 may also be configured to monitor the status of each other volume server in volume server set 270, in addition to monitoring the active volume server. Such monitoring of multiple volume servers may prevent a situation where volume server manager 215 may select a next active volume server 230B that is itself in a failed state. In other embodiments, each volume server 230 may be configured to monitor the status of each other volume server periodically. In one embodiment, each volume server 230 may be configured to run on a different node of a cluster, and cluster management software may be used to monitor the status of each node and to manage failovers in accordance with the failover policy being implemented by volume server manager 215.

In addition to a failover policy, a volume server set management policy may also include a connectivity policy in some embodiments. A connectivity policy may include rules describing the manner in which a requirement for connectivity between the volume servers 230 of a volume server set 270 and block devices 210 is to be managed. As described previously, in order to quickly fail over volume server functionality for a volume 280 from a failed volume server 230A, volume server manager 215 may verify that each potential failover volume server within a volume server set 270 has access to block devices 210 used by volume 280. In one embodiment, one aspect of a connectivity policy may govern whether connectivity for a given volume server set 270 is verified automatically, manually, or using a workflow process.

Figure 6:
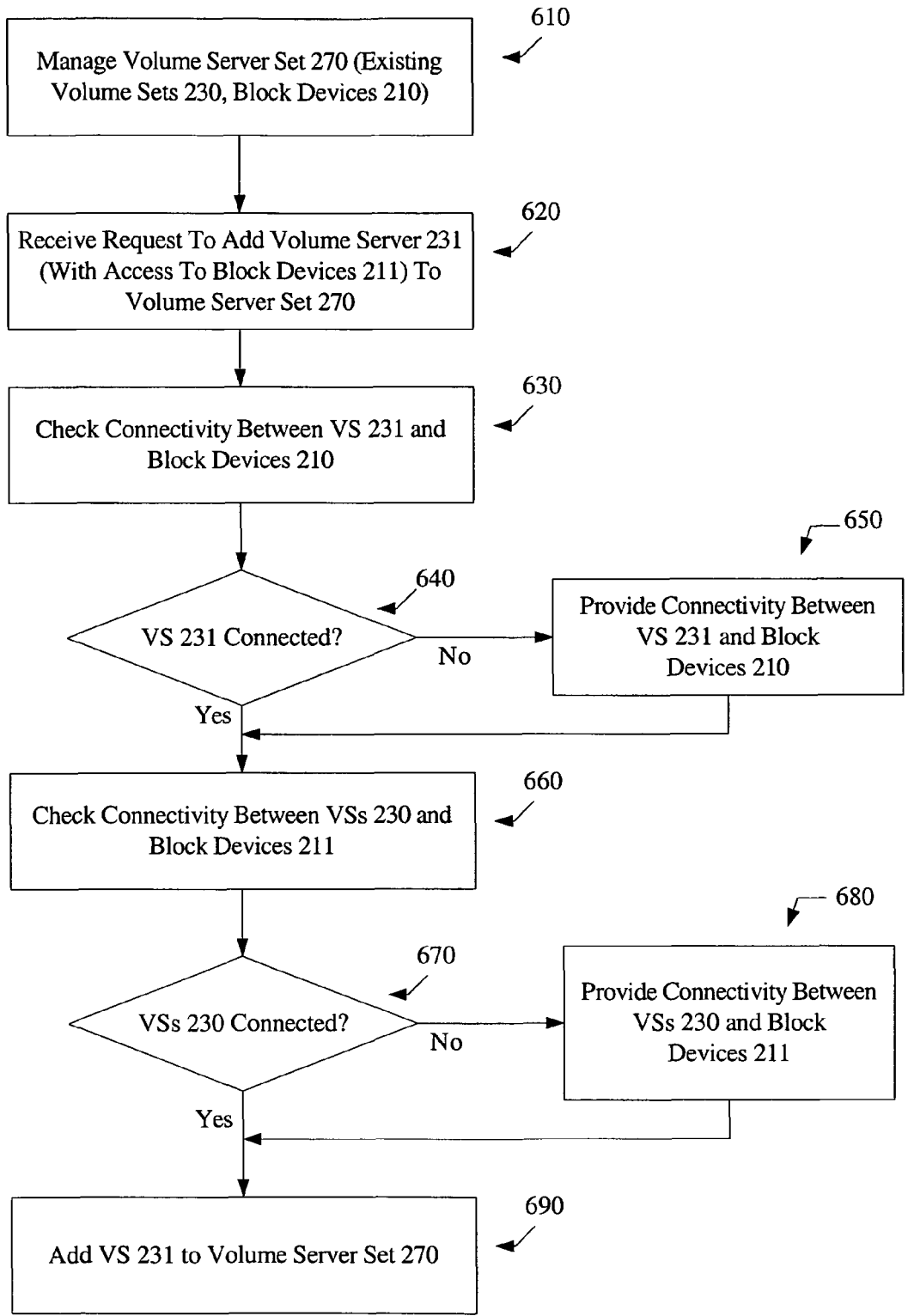
FIG. 6 is a flow diagram illustrating aspects of the operation of a volume server manager in one embodiment where a connectivity policy is employed.

An automatic connectivity policy may be used for a volume server set 270 in an embodiment where volume server manager 215 may be configured to provide volume servers 230 with access (e.g., by modifying zoning configurations or LUN masks) to block devices 210 without explicit manual intervention. FIG. 6 is a flow diagram illustrating aspects of the operation of a volume server manager 215 in one embodiment where an automatic connectivity policy is employed. As illustrated (block 610), volume server manager 215 may initially manage a volume server set 270 including volume servers 230 providing virtualization functions for a set of block devices 210. Volume server manager 215 may receive a request to add a new volume server 231 (with pre-existing access to block devices 211) to volume server set 270 (block 620 of FIG. 6), for example in response to a configuration command from a system administrator or application. In response, volume server manager 215 may check whether volume server 231 already has access to existing block devices 210 (block 630). If new volume server 231 does not have access to one or more block devices 210, volume server manager 215 may automatically provide access to the needed block devices, if an automatic connectivity policy is being employed for volume server set 270 (blocks 640 and 650). In addition, if volume server 231 has access to one or more block devices 211 to which other volume servers 230 within volume server set 270 do not have access, volume server manager 215 may automatically provide access to block devices 211 to all pre-existing volume servers within volume server set 270 (blocks 660-680) prior to adding volume server 231 to volume server set 270 (block 690). Similarly, if a new block device 212 is added to a device group 290 being used for a volume 280 for which volume server functionality is provided by volume server set 270, volume server manager 215 may be configured to automatically provide access to block device 212 to all volume servers that are members of volume server set 270.

In contrast to an automatic connectivity policy, a manual connectivity policy may be employed in some embodiments, for example in a storage environment where providing access to block devices 210 automatically may be undesired or impracticable. In such an embodiment, when a new volume server 231 is to be added to a volume server set 270, volume server manager 215 may still be configured to check whether the new volume server 231 can access the existing block devices 210 managed by volume server set 270, but volume server manager may not automatically provide additional connectivity that may be required. Instead, volume server manager 215 may be configured to notify a system administrator or other agent of a lack of required connectivity, e.g., by an error message in response to an attempt to add volume server set 231 to volume server set 270. In some storage environments, security constraints may require that a workflow process or processes be followed when storage connectivity changes (such as zoning or LUN masking changes) are made. Such a workflow process may, for example, present a request to allow a desired connectivity change to a first user or agent using a specified interface (e.g., e-mail or a workflow-specific graphical user interface). If the first user authorizes the change, a second request to perform the desired connectivity change may be presented to a second user or agent. In some embodiments, a workflow-based connectivity policy may be employed as part of a volume server set management policy. Volume server manager 215 may participate in the workflow process; for example, it may generate an instance of the workflow process when a new volume server 231 is to be added to a volume server set 270 and volume server 231 is found to lack connectivity to some required block devices

210. The actual connectivity change that may result from a use of a workflow-based connectivity policy may be implemented manually in some embodiments (e.g., by a system administrator making zoning changes) and automatically in other embodiments.

The provision or verification of connectivity in accordance with a connectivity policy may be implemented using any of the connectivity establishment and validation techniques described above. For example, in different embodiments, connectivity establishment and validation techniques may include automated discovery or scanning of directly connected storage devices, reading and modification of zoning information, reading and modification of LUN masking information, configuration of an Internet Storage Name Service (iSNS) server, and distribution of iSCSI access keys.

In addition to providing or verifying connectivity to a set of block devices 210 from a new volume server 230 prior to adding the new volume server to a volume server set 270, a connectivity policy may also impose requirements for periodic additional connectivity verification during normal operation. In one embodiment, for example, an active volume server such as 230A may be required to re-verify that it can access a set of block devices 210 at a specified rate, e.g., once every five minutes. In another embodiment, each volume server 230 in a volume server set 270 may be required to periodically verify connectivity to a set of block devices 210. In some embodiments, the volume server manager 215 may perform the desired periodic connectivity verifications. Such periodic verifications may help to reduce the likelihood of a previously undetected loss of connectivity being discovered after a failure occurs, which may prevent or delay a volume server designated as the next active volume server from providing needed volume server functionality.

As illustrated in FIG. 5, a volume server manager 215 may manage multiple volume server sets, such as 270A and 270B, within a given storage environment. In some embodiments, volume server manager 215 may be configured to migrate a given volume server 230 from one volume server set to another. For example, a system administrator may submit a request to volume server manager 215 (e.g., using an administrative graphical user interface or a command-line tool) to migrate volume server 230C from volume server set 270A to volume server set 270B. Volume server manager 215 may verify that volume server 230C has access to block devices 210F and 210G from device group 290C, and migrate volume server 230C from volume server set 270A to 270B after such a verification. In some embodiments, such a migration of a volume server may be accompanied by a migration of connectivity requirements to a specific device group, e.g., 290B. In yet other embodiments, a device group 290 may be migrated to a different volume server set 270 without an accompanying volume server migration. Thus, if device group 290B were migrated to volume server set 270B (with or without volume server 230C), volume server manager 215 may be configured to verify that each volume server in volume server set 270B has access to each block device in device group 290B prior to performing the migration. In addition, if the connectivity policies of volume server set 270A and 270B differed prior to the migration of a volume server 230 or a device group 290 from volume server set 270A to volume server set 270B, volume server manager 215 may be configured to modify the connectivity policy at target volume server set 270B in some embodiments. For example, the stricter of the connectivity policies of the source and target volume server sets (selected based on some specified criteria) may be employed as the connectivity policy for target volume server set 270B.

In some embodiments, a volume server set connectivity policy may include the use of indirect routes or paths between storage devices 210 and volume servers 230. For example, in one embodiment a first volume server 230A may have direct access to a SAN containing the storage device 210, while a second volume server 230B may have direct network access (e.g., via an IP network) only to volume server 230A, and no direct access to the SAN containing storage device 210. Access to storage device 210 from volume server 230B may be provided by volume server 230A in such an embodiment. In other embodiments supporting indirect access, one or more other proxy servers (i.e., servers that may not provide volume server functionality) may also be employed to provide access to storage devices 210 from volume servers 230 of a volume server set 270, and in some cases the indirect path may include more than one proxy server (i.e., more than one "hop"). In one embodiment, for example, volume server manager 215 may be configured to identify indirect paths with a minimum redundancy level (i.e., a minimum number of alternate paths using different proxy servers) and/or a maximum hop count (i.e., a maximum number of proxy hosts between a volume server 230 and a storage device 210 on a given path) as valid connectivity options for a volume server.

As described previously, a volume server set management policy may also include a load balance policy in some embodiments. A load balance policy may be used to balance the workload of a volume server set 270 among its volume servers 230 so as to provide improved overall performance for volume server functions. Volume servers 230 may utilize a number of different physical and logical resources, including CPUs, memory, network hardware, disks and other devices, in providing volume server functionality such as imports of device groups 290 for management by volume server set 270, configuration and modification of volumes 280, and various recovery operations. Volume server manager 215 may periodically gather resource usage statistics from each volume server 230 within volume server set 270, as well as statistics on the number of block devices 210 imported or managed by each volume server, the number and responsiveness of volume configuration operations and recovery operations performed at each volume server, etc., in order to detect load imbalances among the volume servers.

Figure 7A:
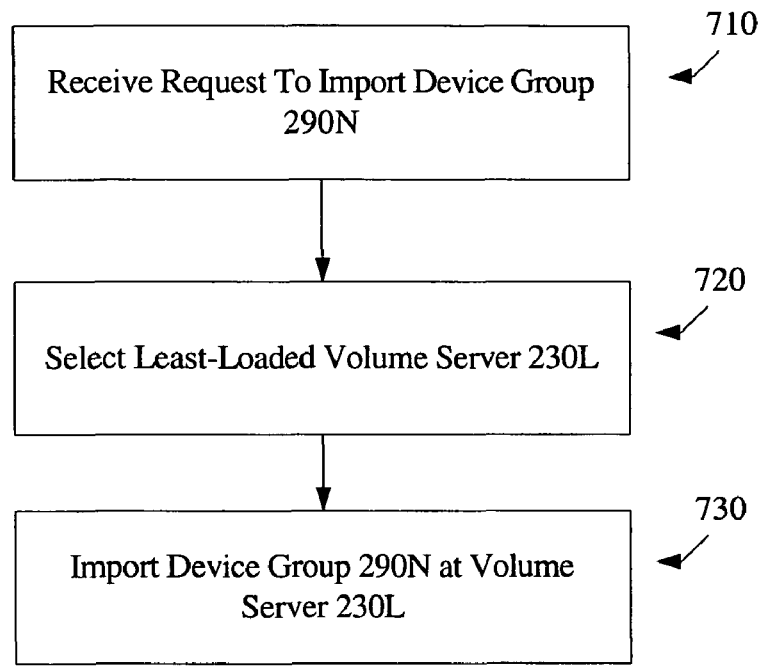
FIGS. 7a and 7b are flow diagrams illustrating aspects of the operation of a volume server manager in an embodiment where a load balance policy is employed.

A load balance policy may be used in one embodiment to direct anticipated additional volume server workloads to lightly loaded volume servers in an attempt to reduce load imbalances, as illustrated in FIG. 7a. An additional device group 290N may be imported to a volume server set 270 from time to time, for example to provide storage space for a new volume 280N. As depicted in block 710, a volume server manager 215 may receive a request to import device group 290N. If a load balance policy is employed for volume server set 270, volume server manager 215 may select a least-loaded volume server 230L (block 720) to import the new device group 290N (block 730). That is, volume server 230L may be designated as the active volume server for any volume 280N that may be aggregated from storage within the new device group 290N.

Figure 7B:
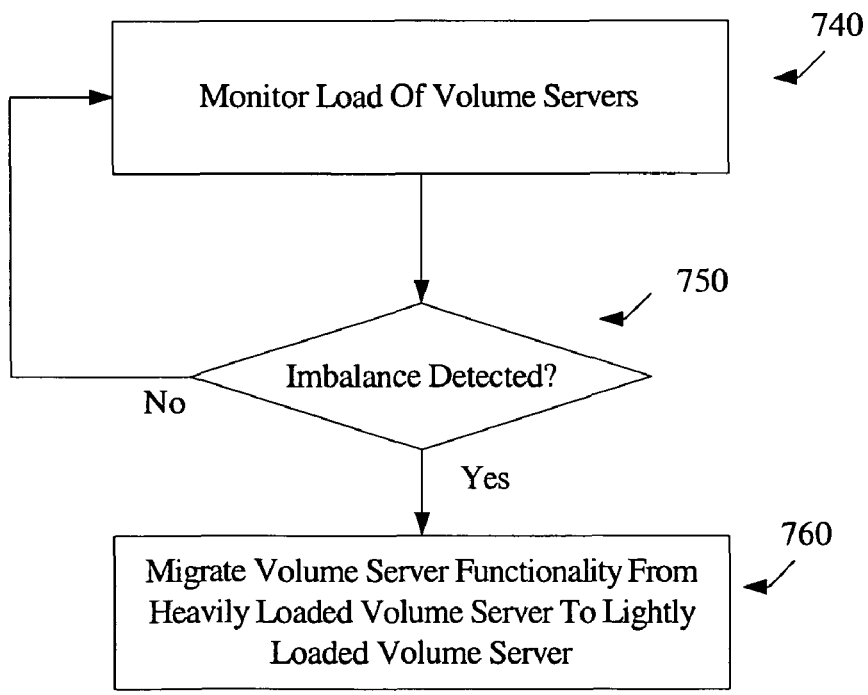

In another embodiment, a load balance policy may be invoked to redistribute volume server workload for a current set of volumes more evenly among the available volume servers, as illustrated in FIG. 7b. For example, in one configuration a volume server 230A may initially be the active volume server functionality for two volumes 280A and 280D, and volume server 230B may initially be the active volume server for a third volume 280E. As depicted in block 740, volume server manager 215 may periodically monitor the load (using some set of specified metrics as described above)

at each volume server in volume server set 270. If a load imbalance is detected (decision block 750), volume server manager 215 may transfer responsibility for some volume server functionality from a heavily loaded volume server to a lightly loaded volume server (block 760). For example, if frequent reconfiguration operations were performed on volume 280A, the responsiveness of volume server 230A to reconfiguration operation requests for volume 280D may be reduced. If a load balance policy were being employed for volume server set 270, and if volume server 230B is found to be lightly loaded compared to volume server 230A, volume server manager 215 may transfer responsibility for providing volume server functionality for volume 280D to volume server 230B; that is, volume server 230B may assume the role of active volume server for volume 280D. Configuration changes within existing volumes (e.g., the enablement of a snapshot functionality or the addition of a new block device to an existing device group) may also trigger the invocation of a load balance policy and a migration of some functionality from one volume server to another. In addition, a change to a membership of a volume server set 270, e.g., an addition or a removal of a volume server 230, may also result in an invocation of a load balance policy.

In some embodiments, the constituent policies of a volume server set management policy may be configured to be triggered automatically upon the detection of an event, and may also be invoked on demand (i.e., manually). For example, a detection of a failure of a volume server may trigger an invocation of a failover policy, a detection of an addition or a removal of a volume server may trigger an invocation of a load balance policy, and one or more commands issued by an administrator (e.g., via a command-line tool or a graphical user interface or GUI) may also result in the invocation of a failover policy and/or a load balance policy. In some embodiments, an application may also request or trigger the activation of a constituent policy of a volume server set management policy (such as a failover). It is noted that prior to failover, load-balancing or migration operations for device groups as described above, in some embodiments a volume server manager 215 may also be configured to ensure that the set of volumes whose data is contained within a device group is assigned to or managed by a single volume server (instead of, for example, being partly managed by two or more volume servers).

The organization of volume servers 230 into volume server sets 270 as described above may allow a rapid resumption of volume server functionality in the event of a failure. In addition to providing highly available volume server functionality, volume server sets may also be used to provide a consistent quality of service to storage consumers, as described below.

Different sets of storage consumers in a large storage environment may have varying performance, availability, and functional service requirements. For example, the users of an online transaction processing application, such as an Internet-based auction service provider, may require rapid responses to I/O requests and may have very strict availability requirements. Each request to write a particular block of data may be required to complete within 20 milliseconds, for example, and it may be a requirement that the system may not be "down" or unavailable for more than a few minutes in a year. In contrast, a content management system for a monthly magazine, where a small number of content contributors may create an article for publication over several weeks, may have generally looser performance and availability requirements. Functional requirements may also differ for different sets of applications: for example, some data mining or analysis applications may require that it be possible to create snapshots (also known as frozen images or point-in-time copies) of a set of data, while other applications may require the ability to replicate data sets remotely (e.g., have a copy of a database on another continent). In order to meet stringent requirements such as extremely fast response times or very high availability, specialized and/or expensive storage hardware (e.g., hardware snapshot-capable disk devices) and software devices may be employed, while off-the-shelf disks (e.g., JBOD or "Just a Bunch of Disks") or inexpensive disk arrays may suffice for other requirement sets.

In order to meet the storage service requirements of different sets of applications, a volume server manager 215 may associate a set of Quality-Of-Service (QOS) requirements with a volume server set in one embodiment. QOS requirements may include performance requirements, availability requirements, functional requirements (such as snapshot capabilities), or any combination of performance, availability and functional requirements. In some embodiments, for example, in order to support a desired level of availability in the event of path failure, a volume server manager 215 may be required to ensure that a specified minimum number of alternate paths to a given storage device from be usable from a given volume server. A variety of metrics may be used to express QOS requirements for different applications; for example, performance requirements may be expressed in metrics such as expected average response times for read and/or write operations of a specific data size, while availability requirements may be expressed in Mean-Time-Between-Failure (MTBF) values or down-minutes-per-year (the maximum number of minutes a storage device may be unavailable during a year). Based upon a set of desired QOS requirements and the kind of virtualization functionality (e.g., mirroring or striping) to be provided by a volume 280, volume server manager 215 may be able to select certain block devices as acceptable for inclusion within a volume server set 270, and reject others. For example, the expected average response time for a write operation may be supplied by a manufacturer of a physical block device, and volume server manager 215 may be able to obtain the expected response time using an administrative interface provided for the block device. In some embodiments, volume server manager 215 may query an interface provided by a block device vendor to detect whether a specific block device 210 is equipped with redundant hardware components such as multiple power supply units, which may affect the availability of the block device. In another example, a device group 290 may consist entirely of hardware-snapshot-enabled block devices 210, and volume server manager 215 may be able to verify whether a new block device to be added to the device group provides the desired hardware snapshot capability.

Figure 8:
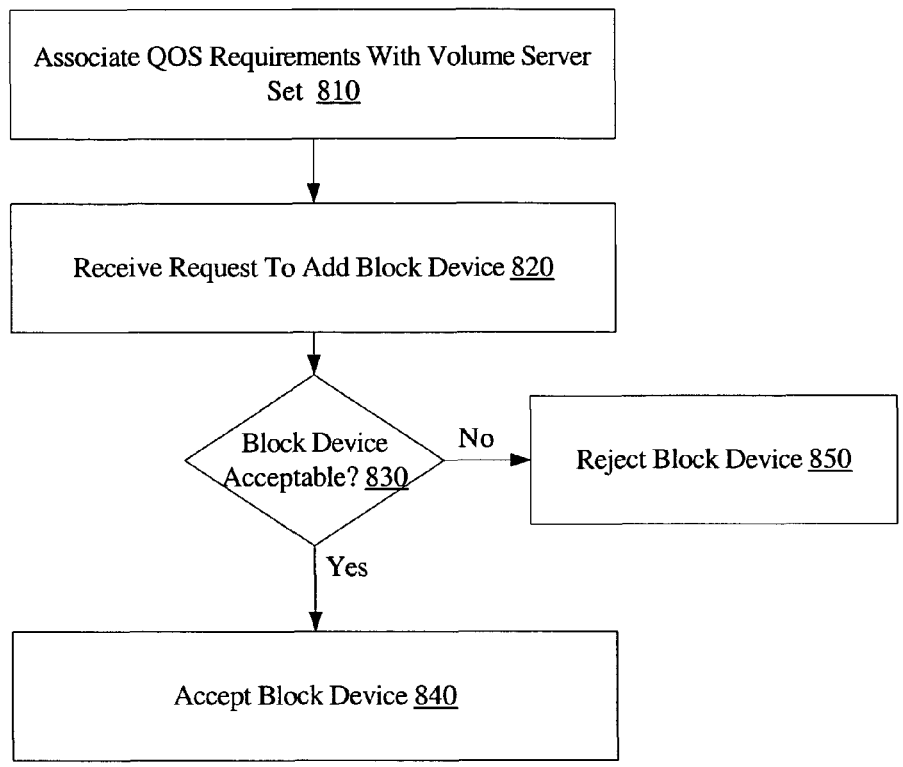
FIG. 8 is a flow diagram illustrating aspects of the operation of a volume server manager in one embodiment where a quality of service requirement is associated with a volume server set.

FIG. 8 is a flow diagram illustrating aspects of the operation of one embodiment of volume server manager 215 configured to verify that a proposed configuration of volume server set 270 meets QOS requirements. As illustrated in block 810, volume server 215 may associate QOS requirements with a volume server set, for example in response to a configuration command from a system administrator. When a request to add a new block device 210 to the set of block devices managed by the volume server set is received (block 820), volume server manager 215 may verify that the new block device is capable of providing the desired quality of service (block 830). As described above, in some embodiments, volume server 215 may be able to verify the capabilities of the new block device automatically. In other embodiments, volume server manager 215 may depend on a system administrator or other agent to perform the verification—for example, volume server manager 215 may display a message asking the user to check that the new block device meets the QOS requirements. If the new block device is found acceptable, it may be included among the set of block devices associated with volume server set 270 (block 840); if it is found unacceptable, it may be rejected (block 850) and an error message may be displayed to inform a system administrator of the rejection.

In some embodiments, other proposed configuration changes such as the removal of a block device 210 may also affect the quality of service of storage operations provided by a volume server set 270, and volume server manager 215 may be configured to disallow a configuration change that may prevent QOS requirements from being met. Storage system administrators may be allowed to inspect QOS requirements (e.g., via an administrative interface to volume server manager 215) associated with different volume server sets 270 in some embodiments, and may use this information to choose an appropriate volume server set to store data for a given application, based on its service quality requirements. In some embodiments, volume server manager 215 may also be configured to gather performance statistics (e.g., response times for I/O operations) and availability indicators (e.g., records of how long a device has been "down" over a period of time) from volume servers 230 and/or block devices 210, and to notify a system administrator if QOS requirements associated with a volume server set 270 are not being met. Thus, in some embodiments, volume server manager 215 may be configured to verify that QOS requirements are met by a current configuration of the volume server set 270.

In general, a volume server manager 215 may be any device or software module capable of providing volume server set management functionality as described above, such as a server computer system, including one or more processors and one or more system memories. Some volume server manager functionality may be spread over multiple computer servers or hosts in some embodiments: for example, status monitoring of volume servers may be implemented using an agent or module at each volume server. To provide high availability for volume server manager functionality, volume server manager 215 may be configured to run on a cluster of nodes, where a failure at one node may result in the volume server manager functionality running on that node to be taken over at another node. In one such clustered embodiment, a volume server manager clustering policy may be employed to migrate or fail over volume server set functionality from one node to another, for example at the request of an administrator or in response to a detection of a specified event. In addition, in some embodiments, a volume server manager 215 may be implemented as a distributed service running on two or more hosts. In one embodiment, for example, a first instance of a volume server manager 215 may be configured to execute at a first host, and a second instance at a second host. In such embodiments, voting or quorum rules could be used to establish a consistent state or to implement or coordinate various elements of a volume server set management policy. In other embodiments, subcomponents of a volume server manager 215 may be executed on different hosts (e.g., a subcomponent implementing load balancing may run on one host and a subcomponent managing failover on another host).

A volume server 230 may be any device (such as a server computer system) capable of hosting software configured to provide the block virtualization functionality described earlier; as also stated earlier, each volume server 230 may also be configured to run on a different node of a cluster in some embodiments. Finally, a volume client 220 may be any type of device capable of interacting with a given volume 280 for data storage and retrieval. For example, in one embodiment a volume client 220 may be a server computer system, including one or more processors and one or more system memories, where the server system is configured to execute software such as one or more operating systems and/or applications. In another embodiment, a volume client 220 may be a client computer system configured to access a given volume 280 via a separate server computer system. A volume client 220 may also be hosted within a virtualization switch that provides additional layers of virtualization on top of a volume 280. In other embodiments, a volume client 220 may be an embedded system configured to use application specific integrated circuit (ASIC) or field-programmable gate array (FPGA) technology to execute operations whereby a given volume 280 may be accessed. In some embodiments a volume client 220 and a volume server 230 may be co-located within the same server. Numerous other configurations of volume server manager 215, volume servers 230, and volume clients 220 are possible and contemplated.

Figure 9:
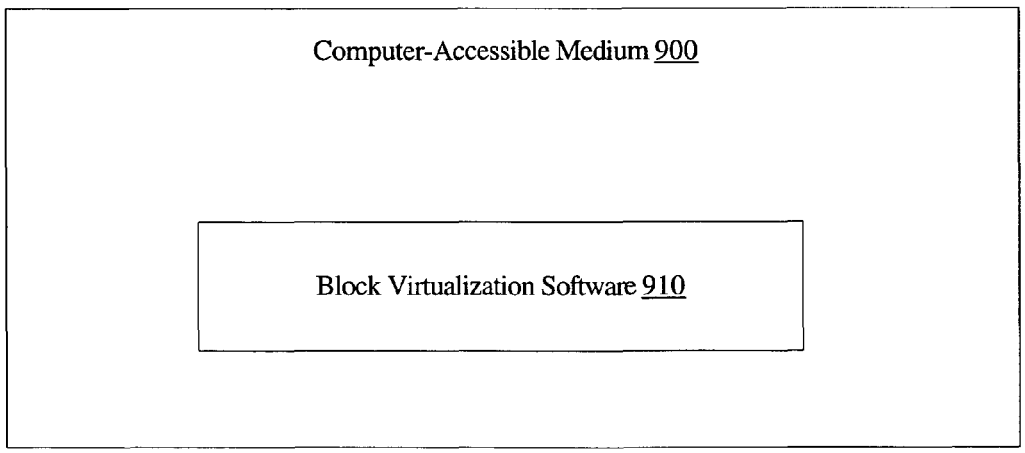
FIG. 9 is a block diagram illustrating a computer-accessible medium.

FIG. 9 shows one embodiment of a computer-accessible medium comprising block virtualization software instructions, which, when executed, accomplish the functionality of volume server manager 215, a volume server 230 and a volume client 220 as described above. Generally speaking, the computer-accessible medium may include storage media such as magnetic or optical media such as RAM (e.g., SDRAM, RDRAM, SRAM, etc.), ROM, etc., as well as transmission media or signals such as electrical, electromagnetic or digital signals, conveyed via a communication medium such as a network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
one or more volume clients;
one or more physical block devices coupled to the volume clients via a network; and
a plurality of volume servers separate from and interposed between said clients and said block devices, wherein said volume servers are coupled to the block devices via a network;
a volume server manager coupled to said plurality of volume servers via a network, wherein the volume server manager is configured to:
designate the plurality of volume servers as a volume server set with an associated volume server set management policy;
verify that storage in each of the one or more physical block devices is accessible to each volume server in the volume server set in accordance with the volume server set management policy; and
designate a first volume server of the volume server set to:
aggregate storage in the one or more physical block devices into a logical volume;
make the logical volume accessible to the one or more volume clients; and
make configuration information for the logical volume accessible to each other volume server of the volume server set;
designate the first volume server of the volume server set as an active volume server, wherein the active volume server is configured to perform virtualization functions for the volume server set;

wherein in response to a failure, the volume server manager is configured to designate a second volume server as an active volume server; and wherein the second volume server is configured to disallow access to the logical volume from the first volume server upon a detection of the failure.

2. The system as recited in claim 1, further comprising a plurality of nodes configured as a cluster, wherein the volume server manager is configured to execute at a first node of the cluster, and wherein the volume server manager is configured to migrate from the first node of the cluster to a second node of the cluster in accordance with a volume server manager clustering policy.

3. The system as recited in claim 1, further comprising a first and a second computer host, wherein a first instance of the volume server manager is configured to execute at the first computer host, and a second instance of the volume server manager is configured to execute at the second computer host, and wherein the first and second instances are configured to coordinate an implementation of the volume server set management policy.

4. The system as recited in claim 1, wherein the volume server set management policy includes a failover policy, wherein the failover policy includes at least one of: a standby failover policy, a load-based failover policy, an external failover policy, and a no-failover policy.

5. The system as recited in claim 1, wherein the volume server manager is further configured to:

monitor the current active volume server;

wherein in response to detecting a failure of the active volume server, the volume server manager is configured to designate the second volume server of the plurality of volume servers as an active volume server; and wherein the second volume server acting as active volume server is configured to disallow access to the logical volume from the first volume server.

6. The system as recited in claim 5, wherein the volume server set management policy includes a connectivity policy, wherein connectivity between a volume server and a physical block device is established in accordance with the connectivity policy using at least one of: automated discovery of devices, modification of zoning information, modification of LUN masking information, configuration of an Internet Storage Name Service (iSNS) server, and distribution of iSCSI access keys.

7. The system as recited in claim 5, wherein the connectivity policy includes at least one of: an automatic connectivity policy, a manual connectivity policy and a workflow-managed connectivity policy.

8. The system as recited in claim 1, wherein the first volume server is configured to periodically verify accessibility to each of the one or more physical block devices.

9. The system as recited in claim 1, wherein the volume server set management policy includes a load-balancing policy.

10. The system as recited in claim 1, wherein the volume server manager is further configured to associate a quality-of-service (QOS) requirement with the volume server set.

11. The system as recited in claim 10, wherein the QOS requirement includes a requirement for a specified minimum number of alternate paths to a storage device.

12. The system as recited in claim 10, wherein the volume server manager is further configured to verify that a current configuration of the volume server set meets the QOS requirement.

13. The system as recited in claim 10, wherein the volume server manager is further configured to verify that a proposed configuration of the volume server set meets the QOS requirement.

14. The system as recited in claim 1, wherein the configuration information includes an identification of the one or more volume clients.

15. The system as recited in claim 1, wherein the configuration information is stored in a configuration database accessible to each volume server of the plurality of volume servers.

16. The system as recited in claim 1, wherein a notification of the designation of the second volume server as an active volume server is sent to the one or more volume clients by the second volume server or by the volume server manager.

17. The system as recited in claim 1, wherein the second volume server is configured to disallow access to the logical volume from an additional volume client without a communication between the second volume server and the additional volume client.

18. The system as recited in claim 17, wherein the additional volume client is provided access to the logical volume by the second volume server using at least one of: zoning, LUN masking, SCSI-3 persistent group reservations, and security tokens.

19. A system comprising:

one or more volume clients;

one or more physical block devices coupled to the volume clients via a network; and a plurality of volume servers separate from and interposed between said clients and said block devices, wherein said volume servers are coupled to the block devices via a network;

a volume server manager coupled to said plurality of volume servers via a network, wherein the volume server manager is configured to:

designate the plurality of volume servers as a volume server set with an associated volume server set management policy;

verify that storage in each of the plurality of physical block devices is accessible to each volume server in the volume server set; and designate a first volume server of the volume server set to:

aggregate storage in a first device group comprising a first subset of the plurality of physical block devices into a first logical volume;

aggregate storage in a second device group comprising a second subset of the plurality of physical block devices into a second logical volume;

make the first and second logical volumes accessible to the one or more volume clients; and make configuration information for the first and second logical volumes accessible to each other volume server of the volume server set;

designate the first volume server of the volume server set as an active volume server, wherein the active volume server is configured to perform virtualization functions for the volume server set:

wherein the volume server set management policy includes a first failover policy for the first device group and a second failover policy for the second device group, and the first failover policy differs from the second failover policy;

wherein in response to a failure, the volume server manager is configured to designate a second volume server as an active volume server; and wherein the second volume server is configured to disallow access to the first logical volume from the first volume server upon a detection of the failure.

20. The system as recited in claim 19, wherein the volume server manager is further configured to designate the second volume server as an active volume server for the second logical volume in response to at least one of: a detection of a load imbalance, an application request, or an administrator request.

21. A system comprising:
one or more volume clients;
one or more physical block devices coupled to the volume clients via a network; and
a plurality of volume servers separate from and interposed between said clients and said block devices, wherein said volume servers are coupled to the block devices via a network;
a volume server manager coupled to said plurality of volume servers via a network, wherein the volume server manager is configured to:
designate the plurality of volume servers as a volume server set with an associated volume server set management policy;
verify that storage in each of the plurality of physical block devices is accessible to each volume server in the volume server set;
designate a first volume server of the volume server set to:
aggregate storage in a first subset of the plurality of physical block devices into a first logical volume;
make the first logical volume accessible to the one or more volume clients; and
make configuration information for the first logical volume accessible to each other volume server of the volume server set; and
designate a second volume server of the volume server set to:
aggregate storage in a second subset of the plurality of physical block devices into a second logical volume;
make the second logical volume accessible to the one or more volume clients; and
make configuration information for the second logical volume accessible to each other volume server of the volume server set;
designate the first volume server of the volume server set as an active volume server, wherein the active volume server is configured to perform virtualization functions for the volume server set;
wherein in response to a failure, the volume server manager is configured to designate a second volume server as an active volume server; and
wherein the second volume server is configured to disallow access to the logical volume from the first volume server upon a detection of the failure.

22. A system comprising:
one or more volume clients;
one or more physical block devices coupled to the volume clients via a network; and
a plurality of volume servers separate from and interposed between said clients and said block devices, wherein said volume servers are coupled to the block devices via a network;
a volume server manager coupled to said plurality of volume servers via a network, wherein the volume server manager is configured to:
designate a first subset of the plurality of volume servers as a first volume server set with an associated first volume server set management policy, and a second subset of the plurality of volume servers as a second volume server set with an associated second volume server set management policy;
verify that storage in a first device group comprising a first subset of the plurality of physical block devices is accessible to each volume server in the first volume server set;
verify that storage in a second device group comprising a second subset of the plurality of physical block devices is accessible to each volume server in the second volume server set;
designate a first volume server from the first volume server set to:
aggregate storage in the first device group into a first logical volume;
make the first logical volume accessible to the one or more volume clients; and
make configuration information for the first logical volume accessible to each other volume server of the first volume server set; and
designate the first volume server of the volume server set as an active volume server, wherein the active volume server is configured to perform virtualization functions for the volume server set;
designate a second volume server from the second volume server set to:
aggregate storage in the second device group into a second logical volume;
make the second logical volume accessible to the one or more volume clients; and
make configuration information for the second logical volume accessible to each other volume server of the second volume server set;
wherein the first volume server set management policy differs from the second volume server set management policy;
wherein in response to a failure, the volume server manager is configured to designate a second volume server as an active volume server; and
wherein the second volume server is configured to disallow access to the logical volume from the first volume server upon a detection of the failure.

23. The system as recited in claim 22, wherein the volume server manager is further configured to migrate the first volume server from the first volume server set to the second volume server set in response to a configuration command.

24. A method comprising:
designating a plurality of volume servers as a volume server set with an associated volume server set management policy;
verifying that storage in each of one or more physical block devices is accessible to each volume server in the volume server set in accordance with the volume server set management policy, wherein said plurality of volume servers is separate from and interposed between one or more clients and said block devices, wherein said volume servers are coupled to the physical block devices via a network; and
designating a first volume server of the plurality of volume servers to:
aggregate storage in the one or more physical block devices into a logical volume;

make configuration information for the logical volume accessible to each other volume server in the volume server set; and make the logical volume accessible to one or more volume clients designating the first volume server of the volume server set as an active volume server, wherein the active volume server is configured to perform virtualization functions for the volume server set;

wherein in response to a failure, the volume server manager designating a second volume server as an active volume server; and wherein the second volume server is configured to disallow access to the logical volume from the first volume server upon a detection of the failure.

25. The method as recited in claim 24, wherein the volume server set management policy includes a failover policy.

26. The method as recited in claim 24, wherein the volume server set management policy includes a connectivity policy.

27. The method as recited in claim 24, wherein the volume server set management policy includes a load balance policy.

28. A non-transitory computer readable storage medium comprising program instructions, wherein the program instructions are executable to:

designate a plurality of volume servers as a volume server set with an associated volume server set management policy;

verify that storage in each of one or more physical block devices is accessible to each volume server in the volume server set in accordance with the volume server set management policy, wherein said plurality of volume servers is separate from and interposed between one or more clients and said block devices, wherein said volume servers are coupled to the physical block devices via a network; and designate a first volume server of the plurality of volume servers to:
aggregate storage in the one or more physical block devices into a logical volume;
make configuration information for the logical volume accessible to each other volume server in the volume server set; and
make the logical volume accessible to one or more volume clients;

designate the first volume server of the volume server set as an active volume server, wherein the active volume server is configured to perform virtualization functions for the volume server set;

wherein in response to a failure, the volume server manager is configured to designate a second volume server as an active volume server; and wherein the second volume server is configured to disallow access to the logical volume from the first volume server upon a detection of the failure.

29. The non-transitory computer readable storage medium as recited in claim 28, wherein the volume server set management policy includes a failover policy.

30. The non-transitory computer readable storage medium as recited in claim 28, wherein the volume server set management policy includes a connectivity policy.

31. The non-transitory computer readable storage medium as recited in claim 28, wherein the volume server set management policy includes a load balance policy.

* * * * *